W. H. De VALIN.
Carriage Wheel.

No. 81,758.

Patented Sept. 1, 1868.

United States Patent Office.

W. H. DE VALIN, OF SACRAMENTO, CALIFORNIA.

Letters Patent No. 81,758, dated September 1, 1868.

IMPROVED WHEEL FOR CARRIAGES.

*The Schedule referred to in these Letters Patent and making part of the same.*

TO WHOM IT MAY CONCERN:

Be it known that I, W. H. DE VALIN, of Sacramento, in the county of Sacramento, and State of California, have invented certain new and useful Improvements in Wheels for Wheel-Barrows, Carriages, &c.; and I hereby declare the following to be a full, clear, and exact description of the same, reference being had to the accompanying drawings, in which—

My invention, although applicable to wheels of other kinds, relates especially to the construction of wheel-barrow wheels, and is intended to impart to such wheels superior lightness, durability, and strength, and at the same time to reduce the cost and labor of construction, so that they may be simply and readily made.

Ordinary cast-iron wheels are too heavy to be successfully employed, and wheels made of wood and iron combined, while lighter than cast-iron wheels, are subject to the influences of heat and moisture, the parts of which they are composed being liable to shrink, and become loose and detached from one another; it is therefore extremely desirable to produce a wheel which shall combine the lightness of the wood and iron wheel with the rigidity and unyielding nature of the cast-iron wheel. To this end I make all of the wheel of wrought iron, excepting the hub, which may be either wrought or cast metal. The tire or rim is secured to the hub by means of spokes, extending diagonally from the former to the latter. Each pair of spokes is formed from a strap of wrought iron attached at the centre to the tire, with its end extending divergingly towards the hub, to which they are secured by bolts, or in any other suitable manner. The spokes therefrom not only serve to connect the rim and hub, but also act as braces to give rigidity to the rim and to all parts of the wheel, while, as they are made of comparatively thin strap-iron, they add but little to the weight of the wheel.

I also mount the wheel in the frame of the wheel-barrow in such manner that the frame is thoroughly braced and prevented from spreading. This, however, and the other features of my invention, will best be understood by reference to the accompanying drawings.

Figure 1:
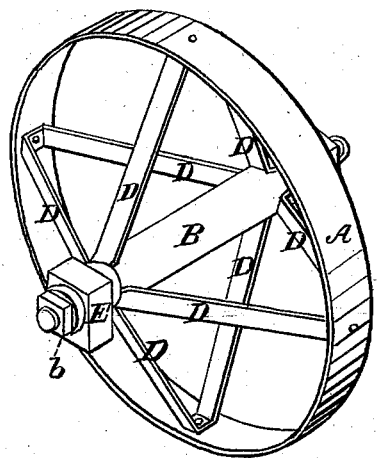
Figure 1 is a perspective of a wheel made in accordance with my invention.
Figure 2:
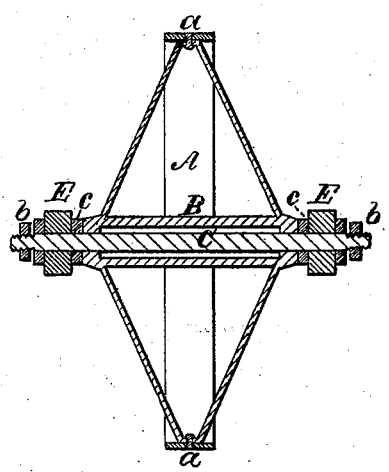
Figure 2 is a section of the same in the plane of the axle.
Figure 3:
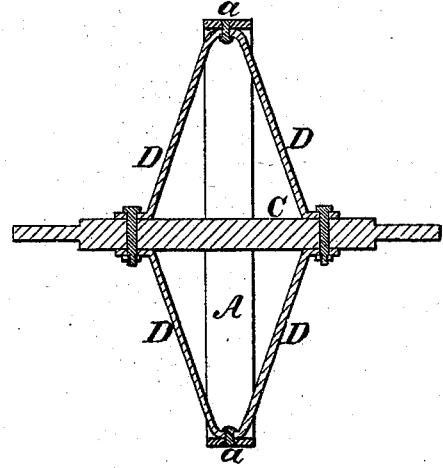
Figures 3 and 4 are like sections of wheels, of a modified construction.
Figure 4:
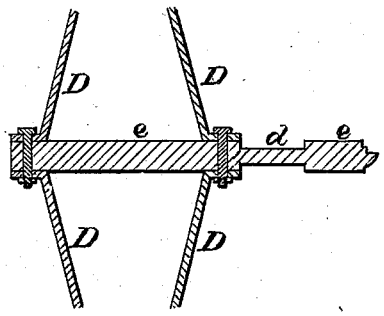

The rim A of the wheel is held to the hub B, as shown in figs. 1 and 2, or to the axle C itself, as represented in figs. 3 and 4, by means of a strap or bar of wrought iron, which is bent at its middle, where it is attached to the rim by rivets or bolts *a*, or other suitable means. The two parts D of the bar or strap, which constitute the spokes, extend divergingly in an equal degree towards the hub B, to which they are riveted, bolted, or welded, or attached in any other suitable manner. As many sets of spokes D D may be employed as desired. It will be seen that they not only serve to support the rim, and hold it to the hub, but that they also act as braces to the whole wheel. They are of little weight, and are combined and united with the other parts of the wheel with the utmost facility. The hub B may be either of cast or wrought iron. When made of wrought iron, a piece of pipe may be used, plugs long enough for bearings for the axle C being welded in the ends, and drilled to correspond with the size of the axle. The hub, if desired, may also be made in two pieces long enough to form a bearing, and united with the spokes in the manner above described, with a brace extending from the one piece to the other to keep them in place.

In fig. 2, the wheel is represented as arranged to revolve on the axle C. E are the ends of the wheel-barrow-frame, in which the axle is mounted, the latter being held in place by means of nuts *b* or pins, which are applied to the ends of the axle, passing through and beyond the frame E. These nuts hold the frame firmly together, and prevent it from spreading when the wheel-barrow is subjected to strain, and the axle is thus made to serve not only to support the wheel, but to brace the whole structure. Washers *c* are placed between the hub and the frame, as shown in fig. 1, so as to prevent wear as far as possible.

In case, however, the axle is intended to revolve, the hub B may be dispensed with, and the spokes D may be attached directly to the axle, as shown in fig. 3, and as above explained. In this instance the rounded and smaller ends of the axle will, of course, revolve in bearings in the frame E. When it is desired to employ two wheels, the axle is formed as illustrated in fig. 4, a bearing, $d$, being formed between the two larger portions $c$ of the axle, to which the diverging spokes of the two wheels are respectively attached.

The same principle of construction may be applied to pulleys, fly-wheels, and other like wheels. The diverging spokes in all instances give greatly-increased strength and durability, while they lessen the cost of the wheel, and are combined and united with the other parts, as above shown, with great ease and facility.

Having now described my invention, and the manner in which the same is or may be carried into effect, what I claim, and desire to secure by Letters Patent, is—

1. Uniting the rim or tire to the hub or axle by means of a series of straps or flat bars of wrought iron, each bent at the middle, where it is attached to the rim, and having its diverging ends extending thence to the hub or axle, to which they are united in the manner set forth.

2. The combination, with the elongated hub, and the axle upon which it is mounted, of the rim or tire, and a series of wrought-iron straps or flat bars, for steadying and bracing the said rim, and for holding the same to the hub, the whole being arranged in the manner set forth.

In testimony whereof, I have signed my name to this specification before two subscribing witnesses.

W. H. DE VALIN.

Witnesses:
 EDWD. CADWALADER,
 JAMES ANTHONY.